T. CADDELL.
ROLL FOR FINISHING AND LIKE MACHINES.
APPLICATION FILED DEC. 20, 1920.
1,435,583. Patented Nov. 14, 1922.
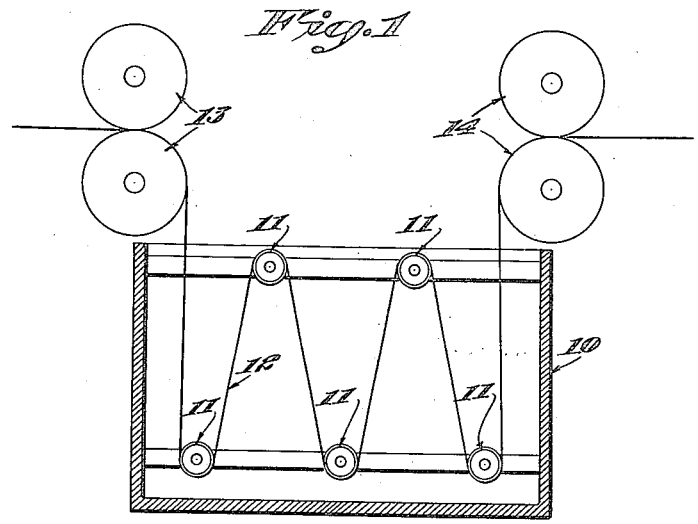
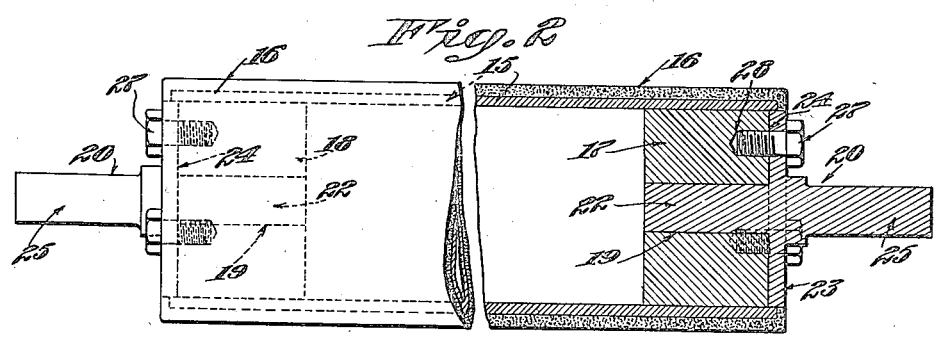
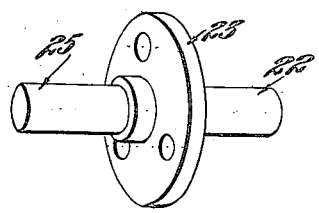

Patented Nov. 14, 1922.

1,435,583

UNITED STATES PATENT OFFICE.

THOMAS CADDELL, OF CANTON, MASSACHUSETTS.

ROLL FOR FINISHING AND LIKE MACHINES.

Application filed December 20, 1920. Serial No. 432,057.

*To all whom it may concern:*

Be it known that I, THOMAS CADDELL, a subject of the King of Great Britain, residing at Canton, in the county of Norfolk and State of Massachusetts, have invented certain new and useful Improvements in Rolls for Finishing and like Machines; and I do hereby declare the following to be a full, clear, and exact description of the invention, such as will enable others skilled in the art to which it appertains to make and use the same.

The present invention relates to rolls more particularly adapted for use in bleaching, dyeing and finishing apparatus.

It is necessary in apparatus of the above described character to provide rolls which are more or less constantly immersed in a liquid which actively corrodes the steel portions of the roll which may be exposed to the liquid. As these rolls may average five to six feet in length, it will be obvious that the continual replacement of the rolls is a matter of considerable expense and in consequence repeated endeavors have been made to provide rolls which will operate for long periods of time. In the form of roll most generally used for immersion purposes a wooden shell is provided with metal ends forced therein and forming the end bearings for the roll. These wooden shells, however, warp and crack and the ends corrode and become loosened in the shell, compelling the roll to be discarded. When this occurs the entire roll including the shell and the metal ends must be replaced at a material cost.

The object of the present invention is to provide a new and improved form of roll which is efficient in its operation and is materially less expensive in upkeep than the types of roll at present in use.

With this object in view one feature of the invention comprises a tubular roll body with a head received in each end and having a longitudinal opening or passage formed therein together with removable end bearing members each having a supporting and positioning stem received and fitting closely in the opening in the head, a flange detachably secured to the head, and a bearing shaft extending from the flange in a direction opposite to the stem.

With this form of construction the end bearing member which is made of steel and subject to a fairly active corrosion by the liquid in which the roll is immersed may be readily removed from the roll and replaced by a new end bearing member whenever desired without necessitating a replacement of the roll as a whole. In order to prevent corrosion of the roll body by the liquid in which the body is immersed the latter is made of any suitable form of metal and completely covered with an outer coating of hard rubber or similar substance vulcanized thereto, the rubber not being subject to corrosion by the liquid and permitting the roll body to be used for an indefinite period without replacement.

Still further features of the invention consist in certain novel features of construction, combinations and arrangements of parts hereinafter described and claimed, the advantages of which will be obvious to those skilled in the art from the following description.

In the accompanying drawings illustrating the preferred form of the invention Fig. 1 represents a partially diagrammatic elevation of an apparatus embodying several immersion rolls of the type described; Fig. 2 is an elevation partly in section of the form of roll constituting the present invention; and Fig. 3 is a perspective view of one of the end bearing members.

The roll constituting the present invention is employed in an apparatus of the general type shown in Fig. 1 and which may comprise a liquid vat 10 having a plurality of immersion rolls 11 about which the web of cloth 12 or other material under treatment passes, these rolls serving to cause the passage of the cloth through the bleaching or dyeing liquid in the usual manner. Before and after its passage through the liquid, the cloth is engaged by squeeze rolls, indicated respectively at 13 and 14, these rolls serving to maintain the proper tension upon the web of cloth and to remove the surplus liquid from the cloth after its exit from the vat.

In the illustrated embodiment of the invention the roll body consists of a hollow metal tube 15 provided with a covering 16 of rubber or similar material vulcanized thereto. The opposite ends of the hollow metal tube 15 receive relatively thick metal heads 17 and 18, each of which is provided with an axial opening or passage 19. These heads serve as a connecting medium for the removable end bearing members indicated at 20 which must be firmly locked to the opposite ends of the roll in order to support the weight of the comparatively long roll supported therebetween. Each of the end bearing members 20 comprises a stem 22 extending within the opening 19 and fitting the opening closely, a flange 23 having a plane face 24 which abuts against the correspondingly shaped face formed upon each of the heads and a bearing shaft 25 extending from the flange in a direction opposite to the stem 22. The bearing shafts 25 are adapted to be received in journal bearings of suitable form supported in the vat 10. The flange 24 is locked to the head by a plurality of cap screws 27 passing through openings formed in the flange and threaded into tapped openings 28 formed in the head. As will be observed from an inspection of Fig. 2, each of the heads 17 and 18 is spaced inwardly from the end of the hollow tube 15 and the flanges formed upon the end bearing members are of a diameter to fit closely within the extended ends of the tube. In order to protect the adjoining faces of the end bearing members and the connecting screws 27 so far as possible from the action of the liquid in which the rolls are immersed, it is desirable to extend the rubber covering around the end of the hollow tube 15 into contact with the flanges 23, as indicated in Fig. 2.

It is found that the form of construction above described serves to support the elongated and small diameter rolls between the end bearings without liablity of the bearing members loosening or becoming displaced with respect to the roll. In addition the bearing members which are preferably made of steel and therefore subject to corrosion by the liquid may be readily detached and replaced by new bearing members without interfering in any manner with the rubber covering upon the roll. As the metal surfaces of the roll body are entirely protected from the liquid, it will be obvious that the roll body may be used for an indefinite period by merely replacing the end bearing members at a relatively small cost when these become so corroded as to be unfit for use. The heads 17 and 18 which are not subject to a bearing strain may be preferably made of cast iron which is only slightly affected by the liquids employed so that even though some liquid may act upon the heads, due to leakage by the end bearing members it will be insufficient to require replacement of the roll body.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:

1. An immersion roll comprising a tubular body member a non-corrodible cover for the body member, heads in opposite ends of the tubular body each having a longitudinal opening, removable end bearing members fastened to the tubular body each comprising a stem received in the opening in the adjacent head, a flange abutting against and secured to the head, and a bearing shaft extending from the flange in a direction opposite to the stem, and means for detachably securing the flanges to the heads.

2. An immersion roll comprising a tubular body, a covering of rubber secured to the body and completely surrounding the peripheral surface, a head received in the body, a removable bearing member having a stem fitting within an opening formed in the head, and a flange abutting against the head, and a plurality of threaded members for securing the flange to the head.

3. An immersion roll comprising an elongated tubular body of comparatively small diameter, a non-corrodible covering for the body, heads received in opposite ends of the tubular body and spaced inwardly therefrom, each head having a longitudinal stem receiving opening formed therein end bearing members detachably secured to the head, each bearing member comprising a stem received in and fitting the opening in the head, a disk shaped flange abutting against the face of the head and fitting within the tubular body, and a bearing shaft extending from the flange in a direction opposite to the stem, and means for detachably securing the flanges to the heads.

4. An immersion roll comprising a metal body of substantially cylindrical form, a non-corrodible covering for the body, removable end bearing members each comprising a positioning stem and a securing flange for engagement with the body member, and means for detachably securing the end bearing members to the body member.

THOMAS CADDELL.